United States Patent

Fannin et al.

[15] 3,690,689
[45] Sept. 12, 1972

[54] COMBINATION VALVE FOR CONTROLLING TWO PRESSURE SOURCES

[72] Inventors: Wayne V. Fannin, Dayton; Harry C. Buchanan, Jr., Centerville, both of Ohio

[73] Assignee: General Motors Corporation, Detroit, Mich.

[22] Filed: April 21, 1971

[21] Appl. No.: 136,116

[52] U.S. Cl.............280/6 H, 280/124 F, 267/65 D
[51] Int. Cl............................................B60g 17/04
[58] Field of Search...........280/6, 6 H, 6.1, 124 F; 267/65 D

[56] References Cited

UNITED STATES PATENTS 3,572,676  3/1971  Ming-Chih Yew ..........267/34

Primary Examiner—Philip Goodman
Attorney—W. S. Pettigrew and J. C. Evans

[57] ABSTRACT

In preferred form, a combination control valve that is carried by the end closure member of a vehicle leveler unit. A resilient, unitary valve element includes a movable seal surface supported on an annular seat formed around a first port in the end closure of the leveler. It also includes a second port adapted to be connected to a vacuum source and a third port adapted to be connected to atmosphere. A nozzle valve seat on the valve element surrounds the third port. A movable valve actuator engages the nozzle valve seat to position the valve element to open and close the first and third ports to regulate the pressure in the leveler unit and control the vehicle height.

6 Claims, 4 Drawing Figures

Patented Sept. 12, 1972

INVENTORS
Wayne V. Fannin &
BY Harry C. Buchanan, Jr.

J.C. Evans
ATTORNEY

INVENTORS.
Wayne V. Fannin &
BY Harry C. Buchanan, Jr.

J.C. Evans
ATTORNEY

COMBINATION VALVE FOR CONTROLLING TWO PRESSURE SOURCES

This invention relates to combination control valves and more particularly to a control valve for regulating the input of first and second pressures into a pressurizable control chamber.

In many pneumatic devices it is desirable to control the input of first and second pressure levels into a control chamber. One example of such a system is a vehicle leveler unit which has a variable volume chamber connected between the sprung and unsprung mass of a vehicle which is pressurizable to maintain a predetermined height relationship between the sprung mass and unsprung mass of the vehicle.

An object of the present invention is to provide an improved undamped, low-cost valve for regulating communication of first and second pressure sources with a control chamber of a leveler unit which includes a unitary valve element on the end closure of the leveler unit which eliminates fluid couplings in the system.

Yet another object of the present invention is to simplify the construction of a combination control valve to regulate the flow of two pressure sources with respect to the control chamber of a pneumatic device by retaining a unitary resilient valve element on an end closure component of the pneumatic device and wherein the valve element and closure are configured to eliminate the need for a separate valve housing.

Yet another advantage of the present invention is to improve and simplify a vehicle leveling system by the provision of a combination vacuum operated bellows and control valve assembly wherein an end closure plate of the vacuum operated bellows is combined with a unitary valve element in a manner that eliminates the need for a separate valve housing and wherein the valve element includes means for controlling communication between a control chamber of the vacuum operated bellows and first and second pressure sources.

Still another object of the present invention is to develop a low-cost controller for use in a vehicle leveling system which includes a unitary valve element of low profile which fits into a flat end closure of a variable volume pressurizable control chamber without interference with adjacent vehicle suspension components and which has a portion thereon movable axially of the closure to control communication between first, second and third ports in the controller and the chamber to level the vehicle.

These and other objects of the present invention are accomplished in one working embodiment of a leveling system in parallel with the main rear suspension springs of a vehicle. Each suspension spring is associated with a vacuum operated bellows and automatic regulation of the car's rear standing height is accomplished by applying a vacuum to the bellows. The bellows is connected between the axle and frame of the car and it pulls the car down against the rear spring to shorten its length to maintain the vehicle at a predetermined height relationship between axle and frame when the car is lightly loaded. Under heavier loading conditions the rear springs of the car are compressed by additional load to retain a desired height relationship.

Atmospheric air is admitted to the bellows when the car is loaded. This diminishes the pull-down force of the bellows and the main spring can expand to maintain a desired height relationship.

Flow of atmospheric pressure and vacuum pressure to the bellows is under the control of a single unitary resilient valve element and tube coupling member which does not require time delayed operation. The valve element is operated in accordance with the rear standing height of the vehicle by a single valve actuator member or control lever to direct atmospheric air or vacuum to the bellows by a poppet valve action. When vehicle load is reduced the spring extends the contracted bellows to cause the valve control lever to move against the valve element and deflect it so as to open a first control port communicated with a second vacuum port; this closes a third atmospheric port and the vacuum in the bellows causes it to correct the length of the primary suspension spring to maintain height relationship; when load is added, the car body deflects downwardly, the valve control lever is positioned out of engagement with the valve element to open the third port from atmosphere to the control chamber of the vacuum bellows to reduce the vacuum and extend the spring.

Both of the vacuum and atmospheric ports in the valve are closed when the proper height is attained. The unitary valve element is of low profile and has one movable portion. Appropriate orifice control of atmospheric and vacuum ports or passageways within the valve element restricts undamped flow to a minimum, while still maintaining adequate leveling response time.

A check valve in the vacuum inlet prevents the bellows vacuum from being depleted during ride motion when the engine is not developing a sufficient vacuum.

These and other objects, advantages and features of the invention will become more apparent as reference is had to the accompanying specification and drawings wherein.

Figure 1:
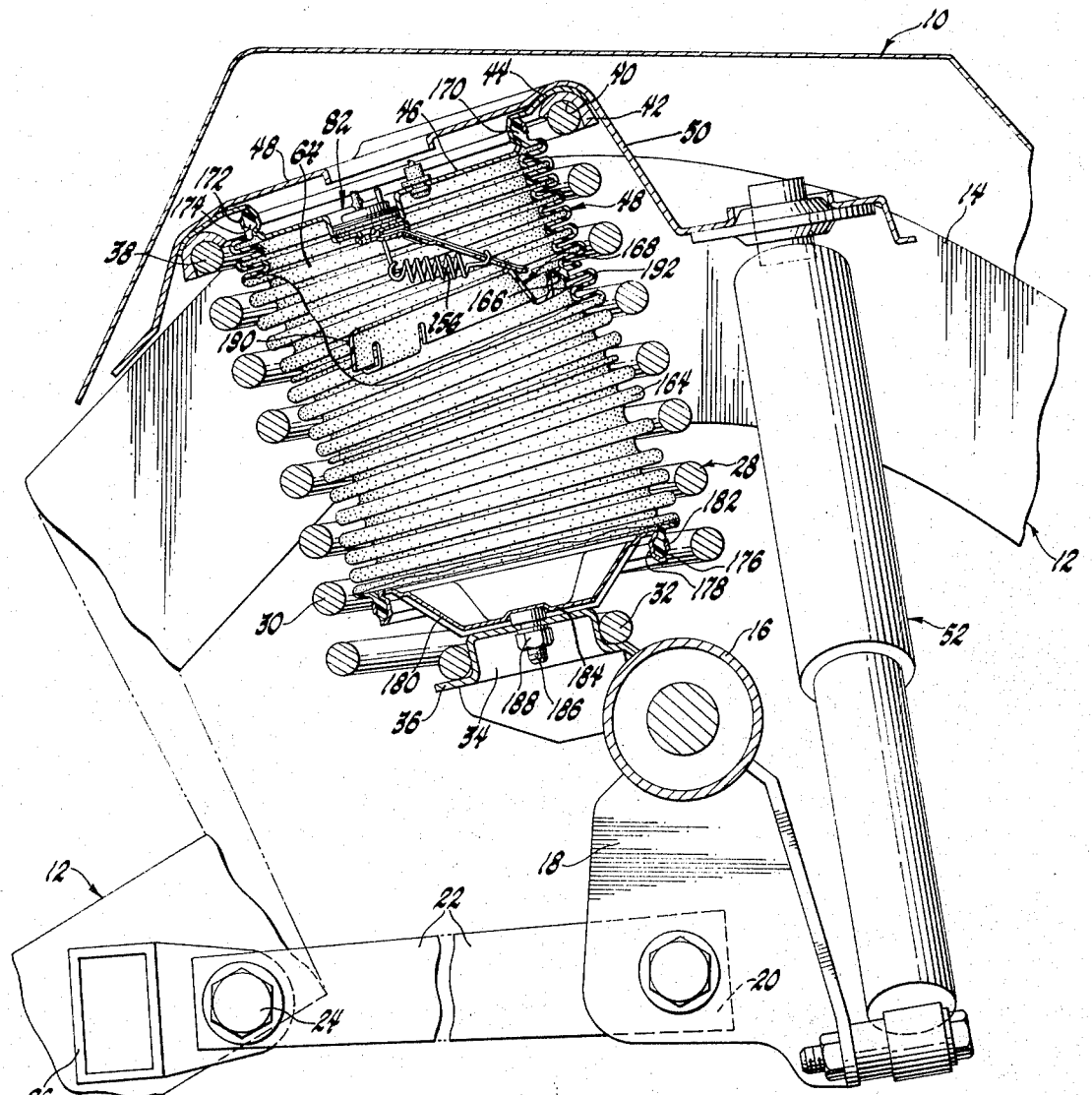
FIG. 1 is a side elevational view partly in section of a vehicle rear suspension assembly incorporating the invention.

In FIG. 1, a portion of a rear suspension of a vehicle 10 is illustrated including a vehicle frame side rail 12 which includes an upwardly bowed portion 14 which extends over the usually transversely extending axle housing 16 upon which a vehicle driving wheel, not shown, is mounted. Axle housing 16 has secured thereto a depending bracket 18 which is pivotally connected at the rear end 20 of a longitudinally extending suspension control arm 22. The forward end of arm 22 is pivotally connected by a bolt 24 to a bracket 26 rigidly connected to the frame side rail 12.

A composite spring assembly 28 spring supports the car body or sprung mass chassis with respect to the axle housing 16. It includes an outer primary suspension coil spring 30 that has a small diameter turn 32 on the base thereof fit around a base support bracket 34. More particularly, it is seated on a radially outwardly directed flange 36 of bracket 34.

The upper coil 38 of the spring 30 is supported in a concave seat 40 of a spring insulator ring 42 which is supportingly received within an upper spring seat 44 which forms part of the upper end closure 46 of a vacuum operated bellows device 48 for leveling the vehicle. The spring seat 44 is seated in a frame member 50 of the vehicle body which is secured to the vehicle frame.

A direct acting hydraulic shock absorber 52 of the telescoping type has the opposite ends thereof connected between the frame member 50 and the bracket 18 for controlling the rate of movement between the vehicle body and the unsprung suspension portion of the vehicle under dynamic road conditions.

Figure 2:
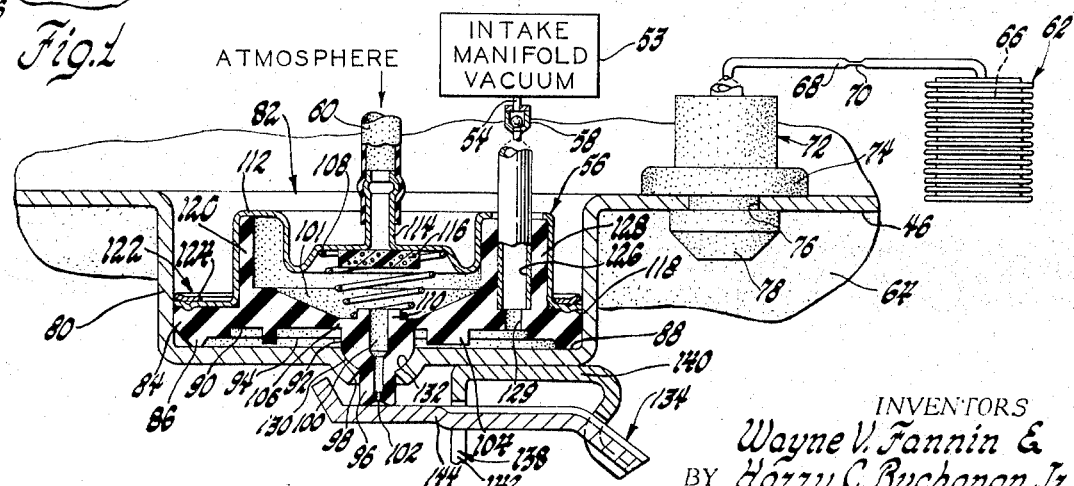
FIG. 2 is an enlarged fragmentary sectional view of an improved combination valve in the present invention in a first operative position.
Figure 3:
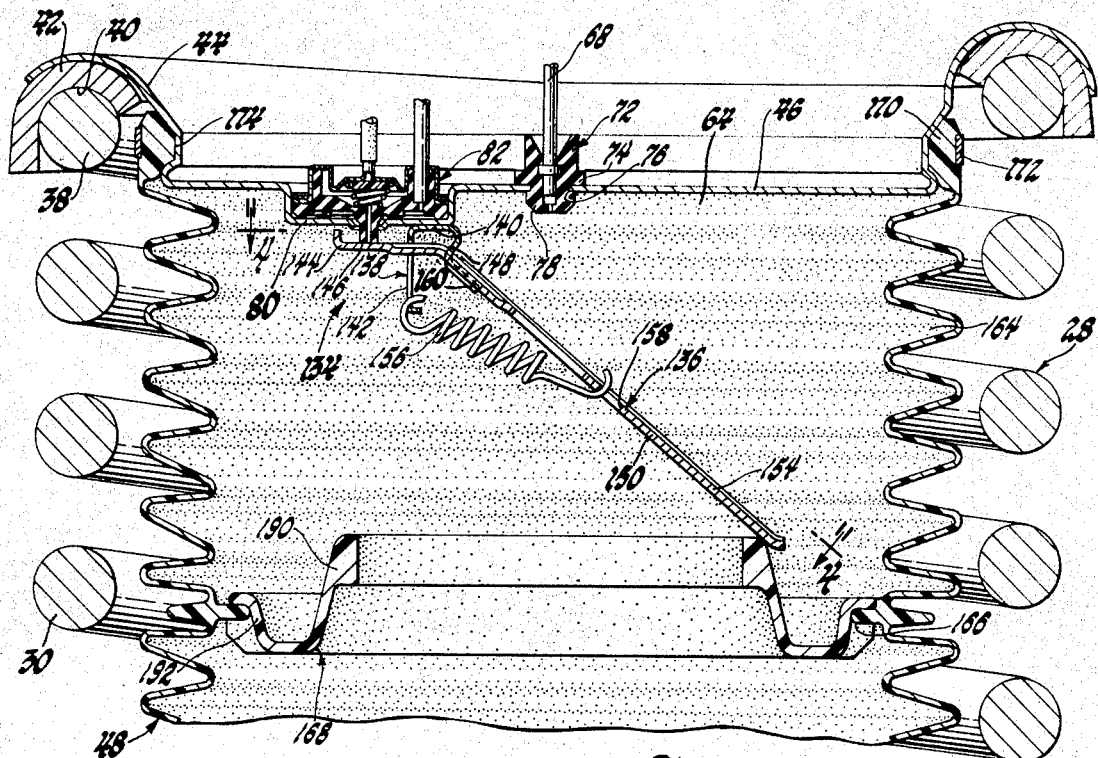
FIG. 3 is an enlarged fragmentary vertical sectional view of the valve and bellows in a second operative position.

The vacuum operated bellows 48 is part of a vehicle leveling system which is diagrammatically illustrated in FIG. 2. It includes a first pressure source represented by the vacuum supply at the intake manifold 53 of the vehicle. It is connected by a conduit 54 to a valve controller 56 constructed in accordance with principles of the present invention. A one-way check valve 58 is provided in the conduit 54 for preventing backflow of pressure from the controller 56 through conduit 54.

The leveling system further includes a conduit 60 connected to the controller 56 which serves to communicate the device with a second pressure source represented in this leveling system by atmospheric pressure.

The illustrated composite spring arrangement 28 on the rear suspension is located at one side of the axle housing 16. A like composite spring is located at the opposite rear corner of the vehicle. It includes a vacuum operated bellows 62, like bellows 48. A variable volume pressurizable control chamber 64 of the bellows 48 is communicated with a variable volume pressurizable control chamber 66 of the bellows 62 by means of a cross-over conduit 68 having a control orifice 70 therein.

The cross-over conduit 68 is connected to a grommet connector element 72 which has a radially outwardly directed flange 74 in sealed engagement around an opening 76 through the end closure 46 through which a tapered inlet end 78 of the connector 72 is snap fit to securely retain it in place.

The illustrated leveling system acts in parallel with the main suspension springs as an auxiliary load compensator. The rear springs of the car are designed to support it at the desired height under fully loaded conditions. Thus, when the car is unloaded the springs will hold the rear end of the body slightly above a desired height relationship between the body and its suspension components. When the car is loaded to a desired point the rear springs are compressed and the vehicle will assume a desired height relationship. At lighter loads when the car body would normally be too high, once the engine is started manifold vacuum is admitted to the bellows and the car is pulled down by contraction of the bellows against the slightly over extended springs to return the car body to a desired height relationship.

More particularly, to accomplish this purpose, controller 56 is formed as an integral part of the vacuum operated bellows 48 which enables it to be installed as an integral package with the bellows as part of the suspension system. This eliminates the need for the mechanical connections between the valve housing and location thereof with respect to the rest of the operative components of the system.

In accordance with certain principles of the present invention this is accomplished in a compact fashion which eliminates the need for external tube connections in the leveling system. Furthermore, it is done in a manner which eliminates the need for a valve housing and is accomplished in a manner wherein the operative components of the valve assembly 56 are located within a clean, dry protective environment inside the bellows.

To accomplish these purposes, the end closure 46 includes a valve cup or recessed portion 80 that extends downwardly from the closure 46 interiorly of the control chamber 64.

The recessed portion or valve cup 80 encloses a low profile pancake formed, unitary valve element 82 which serves as a fluid connector, orifice controller and multiple poppet type valve in the controller 56.

The valve element 82 operates as an undamped device and the orifices therein prevent excessive pressure flows either into or out of the bellows 48 in response to high frequency dynamic movements between the sprung mass and the unsprung mass of the vehicle.

More particularly, the element 82 is a single unitary member which is made of a resilient material such as Buna N-60 durometer rubber. It includes a flat base portion 84 with a continuously formed radially inwardly located lower peripheral seal surface 86 thereon which is seated in sealing engagement with the upper surface 88 of the valve cup 80.

A depending central tube 92 of the valve 82 has an axial extension 96 thereon extending through a vacuum port 98 in the cup 80. An axial passageway 100 extends through the tube 92 and the extension 96 to communicate an atmospheric chamber 101 on one side of the valve element 82 with the control chamber 64.

The passageway 100 includes a small diameter orifice or port 102 therein to regulate the rate of fluid flow through passageway 100.

The element includes reinforcing ribs 104 on the underside thereof located radially outwardly of a circular, reduced hinge section 106 in element 82 that surrounds the tube 92 to permit it to freely deflect axially of the rest of the body of the valve element 82 against the biasing action of a conical spring 108 which has a small diameter end thereof supportingly received around an upstanding spring retainer flange 110 on the upper face of base portion 84. The large diameter end of the spring 108 is seated against a valve retainer plate 112 around an upstanding inwardly formed inlet tube 114 thereon which is connected to the atmospheric tube 60.

The opening 114 is covered by an air filter element 116.

The valve retainer plate 112 is made of sheet metal and includes a peripheral flange 118 slip fit against the inside wall of the cup 80. It is also located against an upstanding annular rib 120 on the element 82 so as to securely maintain the surface 86 in good sealing contact with the end closure 46 around the vacuum port 98 therein. The retainer in turn is held in place by a cavity clip element 122 which seats against the upper surface of the flange 118 and includes a plurality of radially outwardly directed spring fingers 124 thereon which are located in an interference fit with the inside of the cup 80.

The element 82 further includes a vacuum exhaust port 126 which extends through an upwardly directed tubular extension 128 on one side of the element 82.

The vacuum port 126 has the vacuum conduit 54 sealingly connected therein and it is located in alignment with a vacuum orifice 129 extending through the valve element 82 to cavity 90.

The vacuum supply is communicated with the control chamber 64 of bellows 48 and control chamber 66 of vacuum operated bellows 62 through the vacuum port 98 in the valve cup 80 under the control of the depending tube 92 which includes in the illustrated arrangement a spherical outer surface 130 thereon which is maintained by the spring 108 in sealing engagement with a concave, spherical surface 132 formed in the surface 88 around the port 98 in the cup 80.

The representatively illustrated embodiment of the multi-purpose valve element serves to control flow from first and second pressure sources to maintain a predetermined pressure one one side of the end closure 46 with respect to the pressure on the other side thereof.

More particularly, to accomplish this, the valve assembly 56 includes a valve actuator assembly 134 which is responsive to changes in the length of the vacuum operated bellows 48 to control the operation of the valve assembly 56. This is done to maintain a pressure in the vacuum bellows to maintain the sprung mass of the vehicle at a desired height relationship with the unsprung mass by creating a variable pull-down force on the primary coil spring 30 which compensates for changes in vehicle loading.

The valve actuator assembly 134 more particularly includes a valve lever 136 which is supported by a bracket 138 which includes a base portion 140 fixedly secured to the cup 80 to one side of the vacuum port 98 therethrough.

The bracket 138 further includes a bifurcated depending portion 142 which guidingly received a movable valve sealing end portion 144 for pivotal movement with respect to a valve seat 146 formed on the tip of the extension 96.

Valve lever 136 includes a bend 148 between the valve sealing end portion 144 and a pair of spaced apart arms 150, 152 that merge together to form a follower extension 154.

The assembly 134 includes a compression spring 156 that has one end thereon hooked in a hole 158 in the lever 136 adjacent the point of intersection between the arms 150, 152, and the extension 154. The opposite end thereof is secured to a cross arm 160 of the bifurcated depending segment 142 of the bracket 138.

Figure 4:
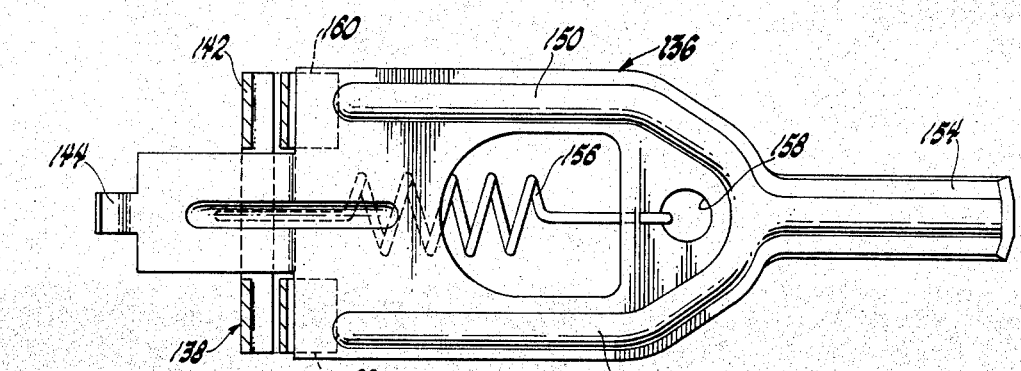
FIG. 4 is a horizontal sectional view taken along the line 4—4 of FIG. 3 looking in the direction of the arrows.

The bracket includes a pair of spaced reversibly bent hinge seats 160, 162 on which lever 136 pivots. They also define guide abutments for the side edges of the valve sealing end portion 144 on lever 136. The seats 160, 162 support the lever 136 at the underside of the arms 150, 152 as best seen in FIG. 4 to define a fulcrum for pivotal movement of the valve lever 136 in response to operation of the bellows 48.

The end closure 46 forms the housing for the valve assembly 56 thereby eliminating the need for a separate housing. Additionally, the end closure 46 is the sole means for closing the upper end of a plastic element 164 made up of a plurality of axially convoluted sections thereon. Element 164 has an intermediate radially inwardly directed ledge 166 formed thereon to support a control ring 168 located interiorly of the control chamber 64.

The closure member 46 is held in sealed engagement with an open end portion 170 on the bellows element 164 by means of a continuously formed bellows retainer band 172 which clamps the end portion 170 of the bellows 164 into good sealing engagement with an annular groove seat 174 formed in the closure 46.

At the lower end of the element 164 there is an open-ended, enlarged thickness annular segment 176 which seats in a continuously formed seat 178 of a bottom closure 180 of the vacuum operated bellows assembly 48. It is sealed thereto by a continuously formed annular band 182.

The bottom closure 180 has a truncated shape which includes a base portion 184 thereon fixedly secured to the lower bracket 34 by means including a threaded bolt 186 on the base 184 and a tightened nut element 188 in threaded engagement therewith.

Thus the plastic element 164 is effectively secured between the relatively moving sprung and unsprung mass of the vehicle by a simplified low-cost pair of closure elements made of lightweight sheet metal material.

Because of this arrangement changes in loading on the vehicle will cause the over-extended spring 30 to be shortened in length to return the vehicle to a desired height relationship when fully loaded. Additionally, when the vehicle is at lighter loads and the spring 30 causes the body of the car to be raised above the desired height relationship with the axle assembly 16 the bellows 48 will expand. This will locate a continually formed annular upstanding portion 190 on the control ring 168 downwardly with respect to the upper closure 46.

The ring 168 also includes a plurality of circumferentially spaced legs 192 directed radially outwardly to snap fit over a portion of the inwardly directed flange 166. This permits the control ring 168 to be separately connected to the bellows and the continuously formed ring 190 is thereby located to contact the follower 154 of the lever 136 under the bias of the compression spring 156.

The primary components of this system have the following characteristics:

| Component | Rating |
|---|---|
| Rear coil spring 30 rate | 69 lbs. per inches |
| Rear coil spring 30 diameter | 8.0 inches |
| System operating vacuum with two passengers | 20 inches Hg |
| Pull-down load at rear axle (two passengers) | 540 lbs. both bellows |
| Vacuum inlet pipe 54 inside diameter | 0.12 inches |
| Atmospheric inlet port 102 orifice diameter | 0.031 inches |
| Crossover tube 68 inside diameter | 0.07 inches |
| Bellows 48 outside diameter | 6.56 inches |
| Bellows 48 height two-passenger load | 8.14 inches |
| Bellows 48 material and durometer | Urethane—65 Durometer |
| Height pull-down with 16 inches Hg | 2.2 inches |
| Pull-down rate at idle | 35 seconds per inch |
| Idle vacuum—warm engine | 16 inches of mercury |

| | |
|---|---|
| Upward response time | 48 seconds |
| Downward response time | 38 seconds |

When the vehicle is at a desired height relationship the valving components are as illustrated in FIG. 2. In this case, the valve sealing portion 144 on the lever 136 engages the seat 146 to seal the atmospheric pressure passageway 100. Additionally, the conical spring 108 maintains the valve depending portion 92 in sealed engagement with the cup 80 around the vacuum port 98. At this point, first and second pressure input supplies are both isolated from the bellows.

When the vehicle load is below that required to compress the primary suspension springs 30 to level the vehicle, and bellows 164 is extended, the spring 156 will pivot the lever 136 to cause the follower extension 154 thereon to move downwardly away from the closure 46 and to cause the valve engaging end 144 to move upwardly towards the cup 80. This will cause the valve element 82 to flex at the reduced section 106 and the tubular portion 92 will move axially upwardly of the cup 80 thereby to move the sealing surface 130 away from the seat 132 to open the port 98. When the car is operating, manifold vacuum is applied to the control chamber 64, 66 thereby causing the bellows assemblies 48, 62 to contract and compress the extended springs of the rear suspension to cause them to contract thereby to return the vehicle to a desired height relationship.

If the load is changed to cause a lesser requirement for vacuum bellows correction, the first effect is that the degree of vacuum in the bellows is too great and a small additional load will cause it to contract still further because of compression of the primary compression springs of the rear suspension. When this occurs, the follower extension 154 on the lever 136 will pivot upwardly towards the closure 46 to cause the valve sealing end 144 to move away from the cup 80. First this causes the centrally located portion 92 on the valve 82 to move into sealing engagement with the seat 132 to block vacuum from the control chambers 64, 66; when the unit passes below the desired height relationship the lever 144 is continually pivoted in the downward direction so as to move away from the seat 146 thereby to open the control chamber 64, 66 to atmosphere. When this occurs the pressure in chambers 64, 66 will increase to reduce the pull-down action of the bellows 46, 62 to return the vehicle to the desired height relationship.

The upward response rate at this point is dependent primarily on the size of the atmospheric port orifice 102. Orifices from 0.015 to 0.06 inch diameter have been used successfully in working installations.

Downward correction rate when load is removed depends on the level of vacuum available and orifice 129. Downward correction can occur only while the engine is running unless a vacuum storage tank is used. Such a tank would be connected to conduit 54 between check 58 and valve assembly 56.

A storage tank volume in the order of 1,000 cubic inches has a pull-down capacity of about 70 percent of an engine operating intake manifold vacuum. Pull-down response accomplished at engine idle and a 16-inch mercury vacuum is accomplished in 38 seconds.

These response times were obtained in one working embodiment using a standard four-door production vehicle having a total curb weight of 4,670 pounds. Full rated load for the car under operating conditions was six passengers plus 200 pounds of trunk load.

Another advantage of the above described system is its dynamic behavior. There is negligible pressure flow in response to normal high frequency road movements. Only significant flows occur under sustained changes in load. The crossover 68 is of a relatively small size to control the roll rate or transfer of pressure from one side to the other as the vehicle follows a curve in the road.

By virtue of the aforedescribed level controller, the system has following performance. There can be an initiation of upward correction as load is added and the engine need not be running in the case of a vacuum tank. There is automatic compensation for suspension spring settling that can occur in use. The system is very simple and includes only a few parts to obtain leveling. It eliminates the need for a pump motor or other added power sources to obtain leveling. It does not add any undesirable break away friction to the suspension system. By virtue of the valve arrangement there is no sliding or dynamic seals that are required which give wear problems following extensive periods of use.

While the embodiments of the present invention, as herein disclosed, constitute a preferred form, it is to be understood that other forms might be adopted.

What is claimed is:

1. An undamped valve assembly for controlling the pressurization of a vehicle leveling system comprising means including an end closure member defining a variable volume pressurizable control chamber of leveler device adapted to be connected between the sprung and unsprung mass of a vehicle for controlling the height relationship therebetween, said end closure member having a cup portion with a first port therethrough, a resilient valve element located within said cup portion including an outer peripheral flange thereon engaging said cup portion for defining a sealed cavity, a second port in said valve element communicated with said sealed cavity and adapted to be connected to a first pressure supply, a depending tube on said valve element extending through the first port in said cup portion and having a valve seat, coacting means on said tube and cup portion for opening and closing said first port, a third port in said tube adapted to be connected to a second pressure supply, a valve actuator member located within the chamber having one end thereof engageable with the valve seat on said depending tube of the valve element to control said third port, said valve actuator member being responsive to changes in the height relationship between the sprung and unsprung mass to assume a first control position in engagement with said seat to block flow through said third port when said first port is closed, said actuator member having a second control position wherein it moves the depending tube away from said cup portion to open said first port therein for communicating said second port and said chamber through said sealed cavity to produce a first pressure change in said chamber to level a vehicle, said actuator member having a third control position wherein it is moved out of engagement with said tube to close said first port and open said third port to cause a second pressure change in said chamber to level a vehicle.

2. A control valve assembly for regulating the pressurization of a control chamber in a vehicle leveler of the type including a vacuum operated bellows for applying a restraining force to shorten the length of a primary, coil type suspension spring to level a vehicle comprising, a valve cup having a peripheral portion adapted to be supportingly received on an open end of a vacuum operated bellows in sealing relationship therewith, said valve cup including a housing portion thereon including a first port therein to direct vacuum interiorly of the bellows during a pump down phase of operation wherein the bellows shortens the length of the coil spring, a dual function valve element including a continuously formed annular seat thereon in engagement with the valve cup housing to define a low pressure zone between the dual function valve element and the valve cup, a second port in said dual function valve for applying engine vacuum to the low pressure zone between the valve element and the valve cup, a depending nose on said dual function valve element extending through said first port and having a seal surface thereon seated against said valve cup around the first port therein when the vehicle is level, a third port through said valve nose communicating the interior of the vacuum operated bellows with atmosphere, a valve retainer located within said cup to secure said valve element therein and to maintain said seal surface thereon in sealing engagement with the cup, a spring biased valve actuator having a first portion thereon pivotally supported for movement with respect to said valve cup, a second portion on said valve actuator engageable with said depending nose for sealing the third port, said valve actuator including a third portion adapted to engage a fixed abutment on said vacuum operated bellows when it shortens the length of the coil spring to move said second actuator portion away from said nose to open said third port thereby to direct a predetermined amount of atmospheric pressure into the bellows in accordance with changes in the degree of contraction of the vacuum operated bellows to maintain a predetermined height relationship between the sprung and unsprung mass of the vehicle.

3. A dual function poppet type valve comprising a valve housing having a first port therein, a resilient valve element having a base portion thereon formed with an annular continuously formed seat in engagement with the valve housing around said first port to define a sealed cavity between said resilient element and said housing, a seat formed in said housing around said first port, a depending nose portion on said valve element having a seal surface thereon supported in sealing relationship with the seat on said valve housing, an extension on said nose portion directed through said port to a point in spaced relationship to said housing, a second port in said valve element adapted to direct a first fluid pressure into said sealed cavity, a third port in said valve element adapted to direct a second fluid pressure through said housing, said third port directed through said extension and said depending nose portion for defining a fluid path in bypassed relationship to the sealed cavity between said valve element and said valve housing, means for biasing said seal surface into engagement with said seat for controlling fluid flow between said sealed cavity an said first port, a movable valve actuator having a portion thereon engageable with the extension for blocking fluid flow through said third port, means for maintaining said valve actuator in engagement with said extension during a first phase of operation wherein said first port is sealed, means for operating said valve actuator out of engagement with said extension to open said third port to direct said second fluid pressure through said housing independently of flow through said sealed cavity, said valving element having a reduced central section formed around said depending nose portion to permit movement of said nose portion axially of said valve element out of sealed engagement with said housing seat to direct said first fluid pressure through said housing via said sealed cavity and said first port.

4. A control valve for a vacuum operated bellows leveling system comprising an end closure plate adapted to close one end of the vacuum operated bellows, a bracket secured to said closure to be located within the bellows, a lever having a valve surface and a portion thereon pivotally secured to said bracket, another portion of said lever adapted to be engaged upon axial deflection of the bellows for angularly pivoting said valve surface thereon with respect to said end closure, a control port in said end closure in communication with said bellows, a resilient valve element sealingly engaging said end closure for defining a cavity between said valve element and said end closure port, said valve element including a depending portion thereon maintained in sealed seated engagement with said end closure around the port therein for sealing said cavity from the interior of the bellows, said valve element including a second port adapted to be connected to a source of vacuum, said second port communicating said source of vacuum with said cavity, said valve element including a third port extending through said depending portion adapted to communicate the interior of the bellows with atmosphere, means for spring biasing said lever in a direction to cause said valve surface thereon to sealingly engage said depending portion for blocking fluid flow between atmosphere and the interior of said bellows, said spring biasing said lever valve surface against said depending portion to cause said valve element to deflect upwardly of said end closure plate to cause the first port therein to be opened when the vehicle is unloaded thereby to communicate the interior of the bellows with a source of vacuum to cause said bellows to contract and pull downwardly against a primary coil spring to level the vehicle, said lever being pivoted in response to contraction of the bellows to cause said valve element to move into a position wherein said depending portion thereon seals said first port to block communication between vacuum and the interior of the bellows, said lever upon further pivotal movement moving said valve surface to open said third port to communicate the interior of the evacuated bellows with atmosphere to maintain the bellows at a control pressure required to maintain a predetermined height relationship between the sprung and unsprung mass of the vehicle.

5. A dual function valve assembly for regulating the pressure in a chamber comprising a housing having a first port therein surrounded by a seat, a single, unitary resilient valve element supported by said housing having a peripheral seal thereon in engagement with said housing for defining a cavity between said housing and said valve element, a second port in said valve element communicating a first fluid pressure input with said cavity, a third port in said valve element adapted to be connected to a second fluid pressure input, a depending extension on said valve element in sealing engagement with said seat to close said first port, a nozzle valve seat on said extension, a movable sealing surface selectively engageable with said nozzle valve seat for moving said extension out of seated engagement with said housing seat to open said first port for communicating the chamber with the first input through said second port, and means including said movable sealing surface for selectively communicating the chamber with the second input thereby to produce a modulation of the pressure within said housing.

6. A valve assembly for controlling the absolute pressure on either side of an end closure element comprising a housing recess, a unitary, resilient valve element located within said housing recess having a peripheral seal thereon engaging said housing, a cavity formed in said valve element to define a fluid space between said valve body and said housing recess, a first port in said housing recess including a valve seat formed therearound, a movable surface on said valve element, means for biasing said movable surface into sealing engagement with said seat for sealing said first port, a second port adapted to be connected to a first pressure source, said second port in communication with said cavity between said valve element and housing recess, a third port through said valve element communicating with a second pressure source on one side of the end closure with the other side of said end closure, a nozzle valve seat on said valve element around said third port, said nozzle valve seat located on said other side of said end closure, a movable sealing surface on the other side of said end closure adapted to selectively engage said nozzle seat to close communication between said third port and said other side, said movable sealing surface having a second operative position wherein it lifts said movable valve element surface from said housing seat to communicate said second port with the one side through said first port while blocking said third port.

* * * * *